(12) United States Patent
Pernstich et al.

(10) Patent No.: US 7,000,875 B2
(45) Date of Patent: Feb. 21, 2006

(54) TRIPOD

(75) Inventors: Ludwig Pernstich, Rum bei Innsbruck (AT); Benno Miller, Innsbruck (AT); Henry Freisinger, Vienna (AT)

(73) Assignee: Swarovski Optik K.G., Tirol (AT)

( * ) Notice: Subject to any disclaimer, the term of this patent is extended or adjusted under 35 U.S.C. 154(b) by 0 days.

(21) Appl. No.: 10/686,170

(22) Filed: Oct. 15, 2003

(65) Prior Publication Data

US 2004/0129843 A1 Jul. 8, 2004

(30) Foreign Application Priority Data

Oct. 22, 2002 (EP) .................. 02023530

(51) Int. Cl.
*F16M 11/38* (2006.01)
(52) U.S. Cl. .................. 248/168; 248/170; 403/109.5
(58) Field of Classification Search ................ 248/168, 248/170, 188.5, 125.1; 403/109.2–109.8
See application file for complete search history.

(56) References Cited

U.S. PATENT DOCUMENTS

| | | | | |
|---|---|---|---|---|
| 5,275,364 A | * | 1/1994 | Burger et al. | 248/125.1 |
| 6,007,259 A | * | 12/1999 | Mori et al. | 396/428 |
| 6,027,087 A | * | 2/2000 | Lindemann et al. | 248/188.5 |
| 6,634,704 B1 | * | 10/2003 | Bergquist | 297/16.2 |
| 6,663,071 B1 | * | 12/2003 | Peterson | 248/440.1 |
| 6,702,482 B1 | * | 3/2004 | Sherwin | 396/428 |

* cited by examiner

*Primary Examiner*—Kimberly Wood
*Assistant Examiner*—Amy J. Sterling
(74) *Attorney, Agent, or Firm*—Fay, Sharpe, Fagan, Minnich & McKee, LLP

(57) ABSTRACT

A tripod (1) has at least one tripod leg (2) consisting of three telescopically guided segments (5–7) for length adjustment. Rotation of one of the segments (6, 7) fixes the adjusted length of the tripod leg (2).

21 Claims, 2 Drawing Sheets

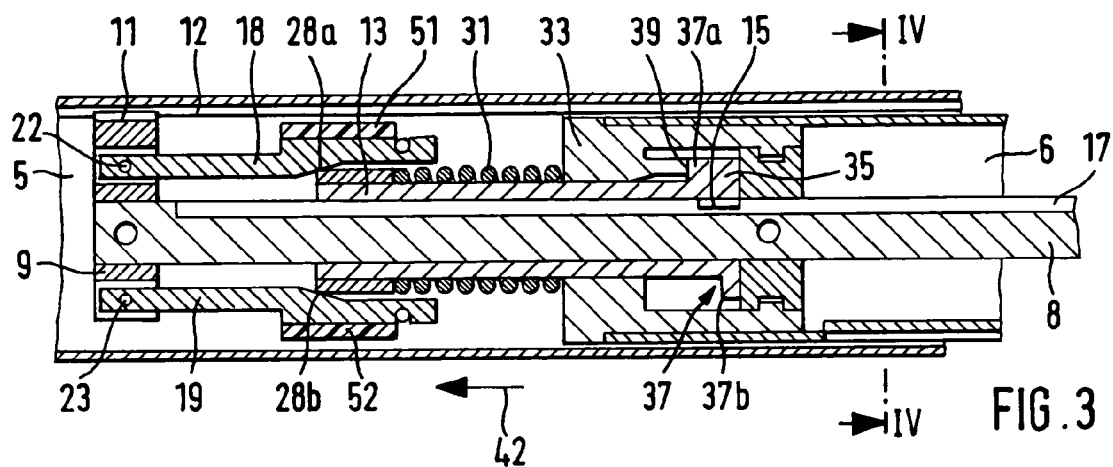
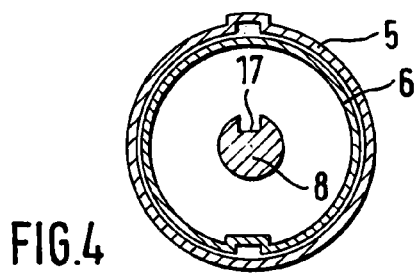 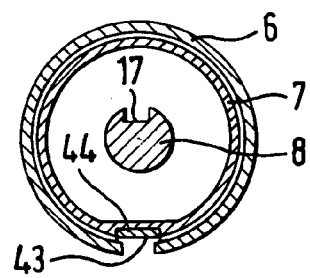
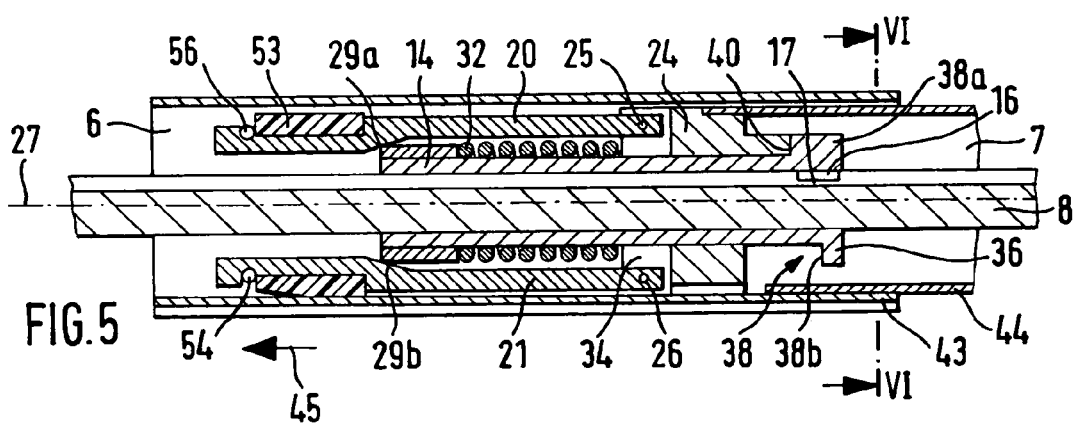
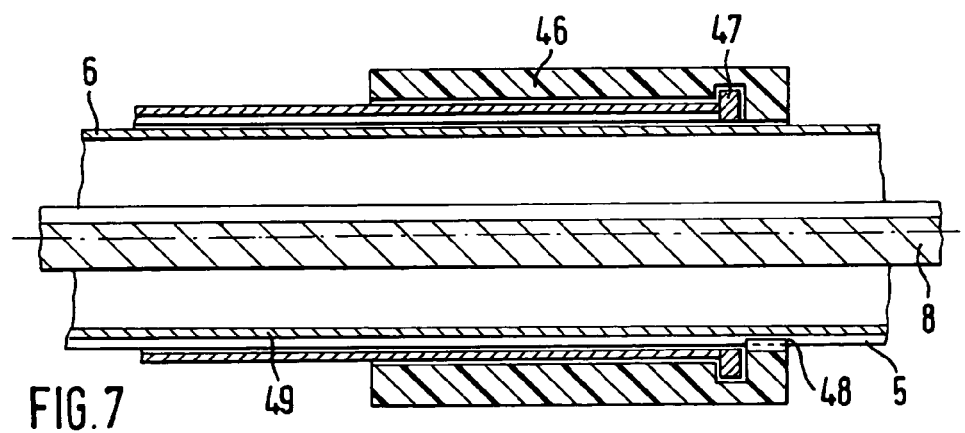

TRIPOD

BACKGROUND

This invention relates to a tripod having a tripod top, at least one tripod leg consisting of at least three telescopically guided tubular segments for length adjustment, and a fixing device for fixing the adjusted length of the tripod leg.

Such tripods, whose tripod top can be formed for example for receiving optical devices, e.g. telescopes or cameras, are known. They usually have three tripod legs. To provide small transport dimensions, the legs are folded inwardly around the substantially horizontally extending axles on the tripod top and the segments of the tripod legs telescoped. To fix the adjusted length of the legs, an operating element is provided between every two adjacent segments in known tripods for actuating a clamping or similar device to fix adjacent segments together. In a three-legged tripod with three tripod leg segments in each case, this results in a number of altogether six operating elements which must each be operated individually for fixation for example when setting up the tripod. Moreover, the bottom operating elements can usually only be actuated in a bent-down posture.

There is a need for a tripod that has small transport dimensions while nevertheless permitting rapid and simple adjustment of the length of the individual tripod legs.

SUMMARY

According to one aspect of the invention, the fixing device of each leg of a tripod is actuated merely by rotating two segments relative to each other, preferably by rotating the middle segment relative to the first or top segment fastened to the tripod top. Thus, to set up the three-legged tripod one need only rotate altogether three segments to fix the segments of all three legs. Thus, the length adjustment of the legs can be performed fast and practically without bending down. According to this aspect, the total fixing device of the tripod leg is thus actuated by rotating one of the bottom segments relative to the segment fastened to the tripod top.

A turning handle can be provided on the bottom end of the first or top segment, i.e. the end facing away from the tripod top, for rotating the middle segment relative to the top segment. Such a handle could additionally facilitate the setting up of the tripod.

The turning handle can for this purpose be mounted rotatably and axially undisplaceably on the top segment. It acts on the middle segment in axially displaceable and rotationally fast fashion, for example by a projection engaging a longitudinal groove of the middle segment.

The third segment is disposed rotationally fast relative to the middle segment, and each further segment relative to the adjacent segment facing the tripod top, for example by a projection engaging a longitudinal groove in the middle or further adjacent segment facing the tripod.

The segments of the tripod legs are preferably formed to be telescopic, each segment preferably being slidably guided in the adjacent segment facing the tripod top.

The formation of the segments as tubes, i.e. as closed profiles, guarantees high stability and moreover minimizes the risk of soiling.

The fixing device is preferably formed as a clamping device to permit infinite longitudinal adjustment.

To permit the formation of closed tubular segments, the clamping device preferably has a rod disposed coaxially in the tripod leg, said rod being guided rotationally fast in the first segment although the other segments can be rotated around it. Further, a slide that is axially displaceable and rotationally fast on the rod is provided to engage at least one clamping element with the inside of the first and middle segments and, in case of more than three segments per tripod leg, with the inside of the third and each further segment, upon rotation of the middle segment relative to the first segment in one direction. Rotation of the middle segment relative to the first segment in the reverse direction disengages the clamping element.

The clamping element, which is preferably formed by a lever, preferably has a friction lining on the inside of the first and middle segments and, in case of more than three segments, the third or each further segment for frictional engagement.

The clamping lever acting on the inside of the first segment is fastened to the rod, preferably at the end of the rod facing the tripod. In contrast, the clamping lever acting on the inside of the middle segment and, in case of more than three segments, each further segment is fastened to the end of the third segment facing the tripod and, in case of more than three segments per tripod leg, to the end of each further segment facing the tripod top.

For acting on the slide, the clamping lever has on its inside facing the rod a surface extending obliquely to the longitudinal axis of the tripod leg. The slide, which is preferably formed as a sheath, is loaded against the oblique surface with a spring. To urge the slide with the spring against the wedge surface on the clamping lever, a ring shoulder with a surface facing the tripod top is provided on the end of the slide facing away from the tripod top. The middle and third segments and, in case of more than three segments per leg, each further segment have on the end facing the tripod top an abutment or opposite surface directed away from the tripod top that is loaded by the spring against the surface on the slide. The surface on the slide is formed as a cam oblique to the longitudinal axis of the tripod leg. Instead, the opposite surface or both the surface on the slide and the opposite surface can also form such a cam.

To release the clamping lever from the frictionally engaged position, it can be loaded by a return spring.

While the lever acting on the inside of the first segment is linked to the end of the rod facing the tripod top, the lever acting on the inside of the middle segment and, in case of more than three segments per leg, the inside of the third and each further segment is linked to the end of the third or next segment facing the tripod.

For example, two or three clamping levers adapted to be spread apart act on the inside of the segments in each case.

BRIEF DESCRIPTION OF THE INVENTION

FIG. 3 shows a longitudinal section through the tripod leg in the area of the device in which the second segment is clamped against the first segment;

FIG. 4 shows a section along line IV—IV in FIG. 3;

FIG. 5 shows a longitudinal section through the tripod leg in the area of the device in which the third segment is clamped against the second segment;

FIG. 6 shows a cross section along line VI—VI in FIG. 5;

FIG. 7 shows a longitudinal section in the area of the turning handle on the first segment.

DETAILED DESCRIPTION

Figure 1:
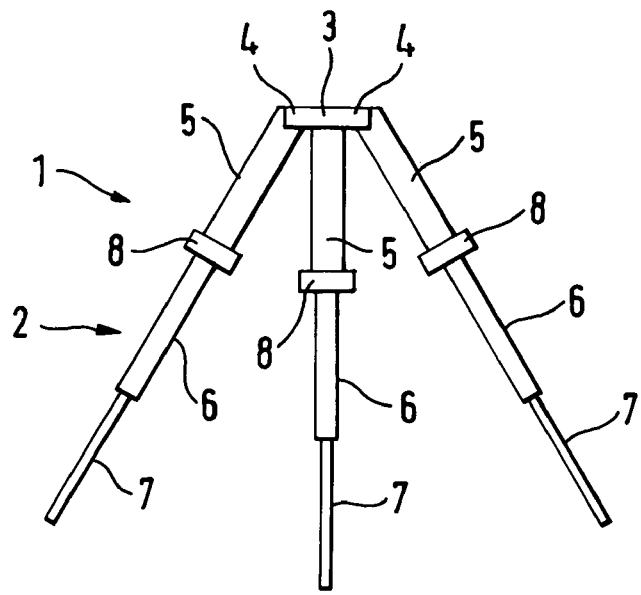
FIG. 1 shows a side view of a tripod.

The tripod (1) has according to FIG. 1 three legs (2) disposed on the tripod top (3) to swivel around substantially horizontally extending axles (4). Instead of being linked directly to the tripod top, the tripod legs (2) can also be linked to a middle column on which the tripod top is disposed.

The legs (2) are formed to be telescopic. For this purpose each leg (2) consists of three telescopically guided tubular segments (5, 6, 7), whereby the bottom inner segment (7), i.e. that facing away from the tripod top (3), is guided in the middle segment (6), and the latter in the top segment (5) linked to the axle (4) on the tripod top (3).

To fix the adjusted length of the telescopic tripod legs (2), i.e. the sliding position of the middle segment (6) and the bottom or third segment (7) of a leg (2), each tripod leg (2) has a fixing device that is actuated by rotation of the middle segment (6) relative to the first segment (5).

The fixing device is formed for this purpose as a clamping device having a rod (8) extending coaxially in the tripod leg (2) and guided rotationally fast on the first segment (5), according to FIGS. 3 to 6. For this purpose the rod (8) is provided on the end facing the tripod top (3) with a cross yoke (9) whose projection (11) engages a longitudinal groove (12) on the inside of the first tubular segment (5). In contrast, the middle segment (6) and the third segment (7) are disposed to rotate around the rod (8) (FIGS. 5 and 6).

Two slides (13, 14) formed as sheaths or sleeves are guided slidably on the rod (8). The slide (13) is provided for clamping the middle segment (6) in the first segment (5), and the slide (14) for clamping the third segment (7) in the middle segment (6). The slides (13, 14) are disposed rotationally fast on the rod (8) by a projection (15, 16) engaging a longitudinal groove (17) in the rod (8).

The clamping device has two or more clamping levers (18, 19) and (20, 21) adapted to be spread apart for clamping the middle segment (6) in the first segment (5) and clamping the third segment (7) in the middle segment (6) in each case. While the clamping levers (18, 19) swivel on the cross yoke (9) around an axle (22, 23) extending transversely to the longitudinal axis (27) of the tripod leg, the clamping levers (20, 21) are linked on the end cap (24) at the end of the third segment (7) facing the tripod top (3) to swivel around transversely extending axles (25, 26).

The slides (13, 14) act on a surface (28a, 28b, 29a, 29b) extending obliquely to the longitudinal axis (27) of the tripod leg (2) on the side of the clamping levers (18, 19; 20, 21) facing the rod (8).

The slides (13, 14) are for this purpose loaded with a spring (31, 32) in the direction of the wedge surface (28a, 28b; 29a, 29b) which is supported at its other end either directly on the end cap (33) on the middle segment (6) or on the end cap (24) on the third segment (7) via a cross yoke (34) to which the levers (20, 21) are linked.

For the slides (13, 14) to be displaced by rotation of the middle segment (6), each slide (13, 14) has at the end facing away from the tripod top (3) a ring shoulder (35, 36) whose surface facing the tripod top (3) is formed as an oblique cam surface (37, 38).

The cam surface (37, 38) is acted on by an opposite surface (39, 40) formed as an abutment and provided on the inside, i.e. the side facing away from the tripod top (3), of the end caps (33, 24).

When the middle tubular segment (6) is rotated, the abutment (39) is thereby moved from the position shown in FIG. 3, in which it lies against the portion (37a) of the cam surface (37), to the portion (37b) of the cam surface (37) on the ring shoulder (35). This causes the slide (13) to be moved by the spring (31) in the direction of the arrow (42) against the wedge surfaces (28a, 28b) of the two clamping levers (18, 19), causing the levers to be spread apart and to lie with their outside surface against the inside of the first tubular segment (5) in frictional engagement.

While the middle tubular segment (6) is rotatable relative to the first segment (5), as apparent in particular from FIG. 4, the middle segment (6) and the third segment (7) are interconnected in rotationally fast fashion. For this purpose the middle segment (6) has an inwardly protruding projection (43) engaging a longitudinal groove (44) in the third segment (7), according to FIGS. 5 and 6.

When the middle segment (6) is rotated, the third segment (7) is corotated, causing the abutment (40) to move from the portion (38a) of the cam surface (38) on the ring shoulder (36) to the portion (38b) of the cam surface and thus the slide (14) to be displaced by the spring (32) in the direction of the arrow (45).

Action of the slide (14) on the obliquely extending surfaces (29a, 29b) causes the clamping levers (20, 21) to be spread apart and thus the segment (7) to be clamped against the segment (6).

To increase the clamping force, the levers (18, 19 and 20, 21) are provided with friction linings (51, 52; 53, 54).

When the abutments (39, 40) lie against the portion (37b, 38b) of the cam surfaces (37, 38) in the clamping position and the clamping is to be released, they are turned back into the position shown in FIGS. 3 and 5. To support the release of the clamping levers (17, 18; 19, 20), return springs (55, 56) are provided that embrace the levers (17, 18; 19, 20).

Figure 2:
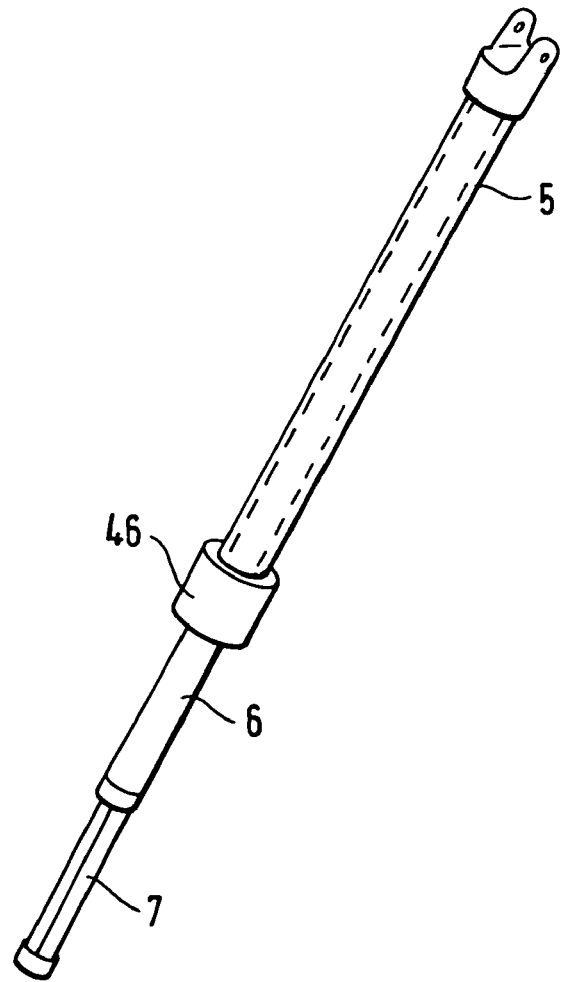
FIG. 2 shows a perspective view of a tripod leg.

To rotate the middle segment (6) and the third segment (7) coupled therewith relative to the first segment (5), a turning handle (46) can be provided according to FIG. 7. The turning handle (46) is pivotally mounted on the first segment (5) with an axial bearing (47). It acts on the middle segment (6) rotationally fast, with the projection (48) engaging a longitudinal groove (49) in the middle segment (6). The turning handle (46) is disposed on the end of the first segment (5) facing away from the tripod top (3), as apparent in particular from FIG. 2.

What is claimed is:

1. A tripod having a tripod top, at least one tripod leg comprising at least three telescopically guided segments for length adjustment, and a fixing device for fixing the adjusted length of the tripod leg, characterized in that the fixing device is actuated by rotation of the middle segment relative to the first segment facing the tripod top, and the third segment facing away from the tripod top is disposed rotationally fast relative to the middle segment, wherein the fixing device is formed as a clamping device that has a rod guided rotationally fast in the first segment and disposed rotatably in the middle and third segments, and a slide rotationally fast and axially displaceable on the rod the side engaging a lever the lever engaging the inside of at least one of the three segments upon rotation of the middle segment relative to the first segment in one direction, and disengaging it therefrom upon rotation in the reverse direction.

2. A tripod according to claim 1, characterized in that a turning handle is pivotally mounted on the first segment to act on the middle segment in rotationally fast fashion.

3. A tripod according to claim 2, characterized in that the turning handle is disposed on the end of the first segment facing away from the tripod top.

4. A tripod according to claim 1, characterized in that the lever is disposed on the rod and acts on the inside of the first segment.

5. A tripod according to claim 1, characterized in that the lever is disposed on the end of the third segment facing the tripod top and acts on the inside of the middle segment.

6. A tripod according to claim 1, characterized in that the lever has a surface extending obliquely to the longitudinal axis of the tripod leg and acted on by the slide.

7. A tripod according to claim 6, characterized in that the lever is loaded toward the oblique surface with a spring.

8. A tripod according to claim 1, characterized in that the one slide has a surface facing the tripod top, and the middle segment and the third segment have an abutment surface loaded by the spring against the surface on the slide, the surface on the slide and/or the abutment surface being formed as a cam surface oblique to the longitudinal axis of the tripod leg.

9. A tripod according to claim 1, characterized in that the lever is loaded out of the engaged position by a return spring.

10. A tripod having a tripod top, at least one tripod leg comprising at least three telescopically guided segments for length adjustment, and a clamping device for fixing the adjusted length of the tripod leg, characterized in that the clamping device is actuated by rotation of the middle segment relative to the first segment facing the tripod top, and the third segment facing away from the tripod top is disposed rotationally fast relative to the middle segment, wherein the clamping device has a rod guided rotationally fast in the first segment and disposed rotatably in the middle and third segments, and a slide rotationally fast and axially displaceable on the rod the slide engaging a lever the lever engaging the inside of at least one of the at least three segments upon rotation of the middle segment relative to the first segment in one direction, and disengaging it therefrom upon rotation in the reverse direction.

11. A tripod according to claim 10, characterized in that the lever acting on the inside of the first segment is linked to the rod.

12. A tripod according to claim 11, characterized in that the lever is linked to the end of the rod facing the tripod top.

13. A tripod according to claim 10, characterized in that the lever acting on the inside of the middle segment is linked to the third segment.

14. A tripod according to claim 10, characterized in that at least one lever adapted to be spread apart acts on the inside of the first segment and/or the middle segment in each case.

15. A tripod according to claim 9, characterized in that the return spring connects the two levers.

16. A tripod according to claim 1, characterized in that the at least one slide is formed as a sheath displaceable on the rod.

17. A tripod according to claim 1, characterized in that at least one of the end of the middle segment and the end of the third segment facing the tripod top has an end cap.

18. A tripod according to claim 8, characterized in that the abutment surface is provided in the end cap.

19. A tripod according to claim 8, characterized in that the spring loading the at least one slide is supported on the end cap.

20. A tripod according to claim 1, characterized in that the at least two slides includes a first slide and a second slide, wherein, upon said rotation of the middle segment, the first slide engages a first clamping element with the inside of the first segment and the second slide engages a second clamping element with the inside of the middle segment.

21. A tripod, comprising:
a tripod top;
at least one tripod leg having at least three telescopingly guided segments including a first segment adjacent said tripod top, a middle segment and a third segment rotationally fast relative to said middle segment; and
a fixing device for fixing the adjusted length of said at least one tripod leg, said fixing device actuated by rotation of said middle segment which fixes the adjusted length of the middle segment and the third segment the fixing device formed as a clamping device having a rod guided rotationally fast in the first segment and disposed rotably in the middle and third segments, and a slide rotationally fast and axially displaceable on the rod the slide engaging a lever the lever engaging the inside of at least one of the three segments upon rotation of the middle segment relative to the first segment in one direction, and disengaging it therefrom upon rotation in the reverse direction.

* * * * *